(12) United States Patent
Wagner et al.

(10) Patent No.: US 8,327,264 B2
(45) Date of Patent: Dec. 4, 2012

(54) DOCUMENT PERSONALIZER

(75) Inventors: Dirk Wagner, Schiffweiler (DE); Frank Wittig, Spiesen Elversberg (DE)

(73) Assignee: SAP AG, Walldorf (DE)

( * ) Notice: Subject to any disclaimer, the term of this patent is extended or adjusted under 35 U.S.C. 154(b) by 1145 days.

(21) Appl. No.: 11/862,948

(22) Filed: Sep. 27, 2007

(65) Prior Publication Data

US 2009/0089664 A1    Apr. 2, 2009

(51) Int. Cl.
*G06F 17/21* (2006.01)

(52) U.S. Cl. ........................................ 715/255

(58) Field of Classification Search .................... 715/255
See application file for complete search history.

(56) References Cited

U.S. PATENT DOCUMENTS

| | | | | |
|---|---|---|---|---|
| 5,764,899 | A * | 6/1998 | Eggleston et al. | 709/203 |
| 5,845,302 | A * | 12/1998 | Cyman et al. | 715/209 |
| 5,944,786 | A * | 8/1999 | Quinn | 709/206 |
| 6,498,987 | B1 * | 12/2002 | Kelly et al. | 702/3 |
| 6,587,849 | B1 * | 7/2003 | Mason et al. | 1/1 |
| 6,643,652 | B2 * | 11/2003 | Helgeson et al. | 1/1 |
| 6,799,299 | B1 * | 9/2004 | Li et al. | 715/235 |
| 6,826,597 | B1 * | 11/2004 | Lonnroth et al. | 709/207 |
| 7,613,742 | B2 * | 11/2009 | Bohannon et al. | 1/1 |
| 7,689,606 | B2 * | 3/2010 | Burgoyne et al. | 707/643 |
| 2003/0041050 | A1 * | 2/2003 | Smith et al. | 707/1 |
| 2005/0027781 | A1 * | 2/2005 | Curry et al. | 709/200 |
| 2005/0228711 | A1 * | 10/2005 | Lahey et al. | 705/9 |
| 2008/0278740 | A1 * | 11/2008 | Bird et al. | 358/1.15 |

OTHER PUBLICATIONS

Ed Bott and Woody Leonhard; Special Edition Using Microsoft Office 2003; Sep. 15, 2003; Que Publishing; pp. 579-594.*
Bob DuCharme; Conditional Execution; Apr. 2, 2003; O'Reilly Publishing; pp. 1-5.*
Dynamic Mail Merge; Dec. 16, 2012; Cooleremail.com; pp. 1-2.*

* cited by examiner

*Primary Examiner* — Doug Hutton, Jr.
*Assistant Examiner* — Andrew Dyer
(74) *Attorney, Agent, or Firm* — Brake Hughes Bellermann LLP

(57) ABSTRACT

A variable parser may be configured to determine a plurality of variables associated with a mailform template, the mailform template including one or more conditions. A data parser may be configured to determine one or more values associated with a target recipient and corresponding to each of the plurality of variables. A condition evaluator may be configured evaluate the one or more conditions based on one or more of the values to determine content associated with the personalized message. Replacement logic may be configured to replace, for the personalized message, each of the plurality of variables with the corresponding one or more values. A delivery engine may be configured to provide the personalized message including the one or more values and the content to the target recipient via one or more of the channels.

18 Claims, 4 Drawing Sheets

DOCUMENT PERSONALIZER

TECHNICAL FIELD

This description relates to personalization of documents.

BACKGROUND

Customer service is an integral part of most businesses. An important part of customer service is getting to know your customers and catering to each individual customer's needs and preferences, making each one feel important. Personalized customer service may be important not only in retaining current customers with established relationships, but also in recruiting new customers as well. For example, a customer or potential customer receiving a marketing letter from a business may prefer to be addressed by his or her name rather than simply "Dear Customer." Or for example, a customer may be more likely to respond to a marketing letter from the business if the letter included references or other information pertaining to the hobbies and/or interests of the customer (or potential customer). However for larger businesses, or business with a large number of customers or potential customers to be contacted, it may be very time consuming to individually draft newsletters or other messages catered specifically to each individual customer.

As referenced above, part of good customer service is getting to know your customer, knowing information such as their name, contact information, purchase history, hobbies and interests, and even likes and dislikes. Using this information it may be possible to better individually cater, for example, marketing newsletters to each customer or potential customer (e.g., target recipients). However manually drafting such newsletters based on the information gathered on each target recipient may be a very time consuming process, and may be impractical for businesses with a large number of target recipients.

SUMMARY

According to an example embodiment a system for providing a personalized message via one or more channels is provided, in which a variable parser is configured to determine a plurality of variables associated with a mailform template, the mailform template including one or more conditions. A data parser is configured to determine one or more values associated with a target recipient and corresponding to each of the plurality of variables. A condition evaluator is configured evaluate the one or more conditions based on one or more of the values to determine content associated with the personalized message. Replacement logic is configured to replace, for the personalized message, each of the plurality of variables with the corresponding one or more values. A delivery engine is configured to provide the personalized message including the one or more values and the content to the target recipient via one or more of the channels.

According to another example embodiment a computer program product being tangibly embodied on a computer-readable medium and being configured to cause a data processing apparatus to determine a mailform template associated with a personalized message, the mailform template including a plurality of variables and conditions, determine one or more values associated with each of one or more target recipients and corresponding to each of the plurality of variables, and for each of the one or more target recipients: replace the plurality of variables with the corresponding one or more values associated with the target recipient, evaluate the conditions of the mailform template for the target recipient based on one or more of the values, and generate the personalized message for the target recipient based on the replacement of the plurality of variables and the evaluation of the conditions.

According to another example embodiment a method is provided. An execution service associated with a mailform template is initialized, the mailform template including a plurality of variables and one or more conditions for determining content of a personalized message for each of a plurality of target recipients. The plurality of variables associated with the mailform template is received from the execution service. One or more values associated with each of the plurality of target recipients and corresponding to each of the plurality of variables are provided to the execution service. The personalized message for each of the plurality of target recipients is received from the execution service, the personalized message including the content determined based on an evaluation of the one or more conditions and the one or more values associated with each target recipient replacing each of the corresponding plurality of variables.

The details of one or more implementations are set forth in the accompanying drawings and the description below. Other features will be apparent from the description and drawings, and from the claims.

DETAILED DESCRIPTION

Figure 1:
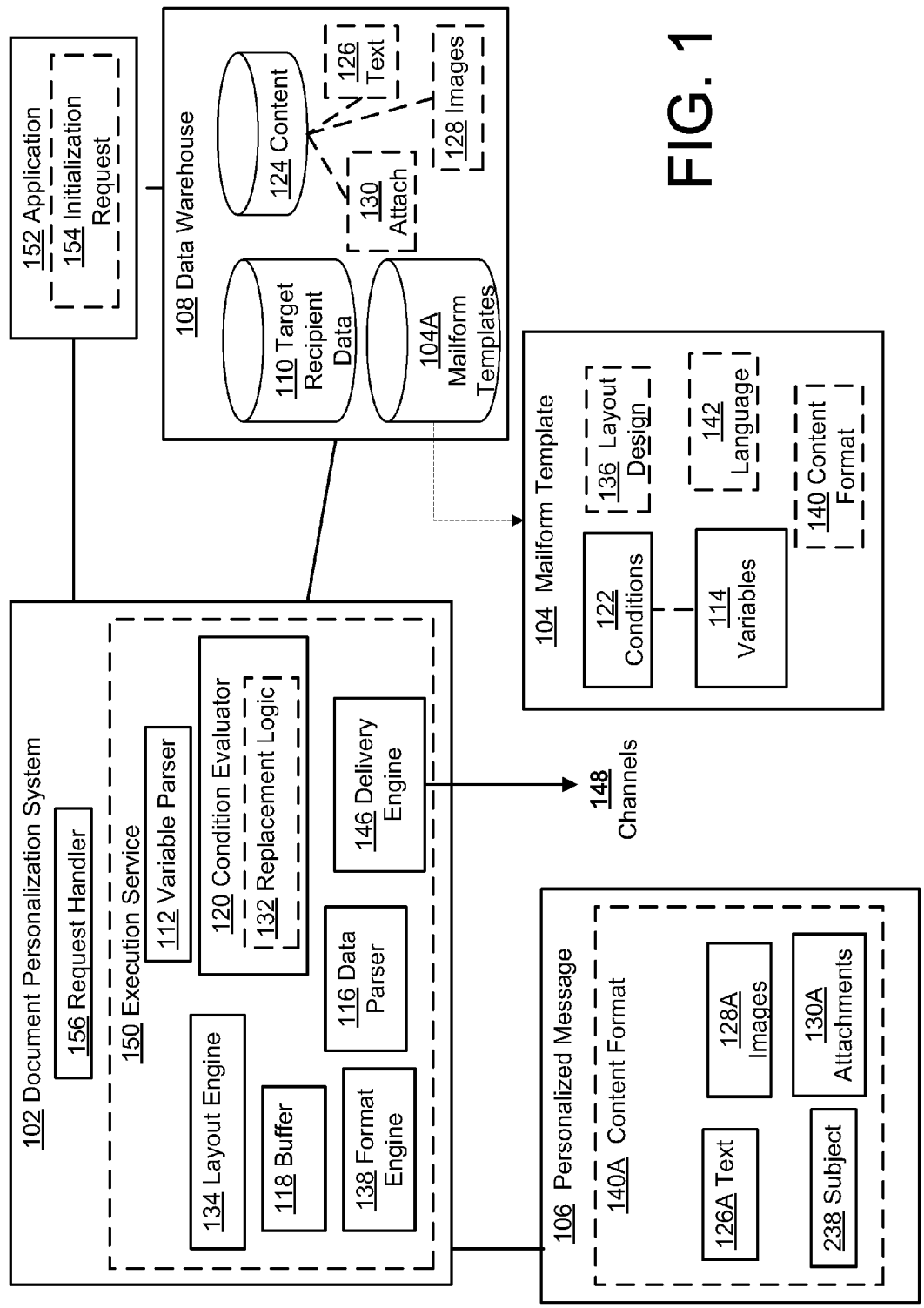
FIG. 1 is a block diagram of an example document personalization system, according to an example embodiment.

FIG. 1 is a block diagram of an example document personalization system 102, according to an example embodiment. In the example of FIG. 1, the document personalization system 102 personalizes or customizes messages for each of one or more target recipients based on information gathered for each target recipient and a template associated with the messages. The document personalization system 102 may for example, receive an identification of the template and the target recipients, and then generate messages personalized for each target recipient based on data associated with each target recipient, including messages in various languages. Then for example, the document personalization system 102 may provide the messages to a calling application and/or to the target recipients via one or more communication channels.

The document personalization system 102, as referenced above, may receive an identification of a mailform template 104. The mailform template 104 may include a template used to generate a message for one or more target or potential recipients. The mailform template 104 may include, for example, layout, format, and content options that may be included in or excluded from the message based on characteristics or data associated with each of the target recipients. For example, the mailform template 104 may include a plurality of message backgrounds, one of which is to be selected based on the interests (e.g., data) associated with each target recipient. The backgrounds may include a sports-themed background for any target recipient whose interests include sports and an exotic car background for any target recipient whose interests include cars. According to another example embodiment, the mailform template 104 may include separate introductory paragraphs, each one being associated with a different part of the world. Then for example, based on a target recipient's location, the introductory paragraph associated with the part of the world where the target recipient is located may be included in a personalized message 106 for the target recipient.

According to an example embodiment, the mailform template 104 may include a hierarchical structure ordered from a root node, including sub-elements at each of multiple hierarchical levels. For example, a mailform node may include sub-elements indicating subject attributes associated with subject lines of messages, such as content and conditions associated with the subject lines.

As referenced above, the document personalization system 102 may generate the personalized message 106 based on the mailform template 104. The personalized message 106 may be generated by the personalization system 102 parsing through data associated with a target recipient and generating or otherwise assembling the personalized message 106 based on the data and the mailform template 104. For example, the document personalization system 102 may determine which portion(s) of the mailform template 104 are relevant to a target recipient, and place those relevant portion(s) into the personalized message 106. In continuing the example above, the personalized message 106 may include the sports-themed background if the document personalization system 102 determines that the target recipient is interested in sports. The personalized message 106 associated with each target recipient may include a message personalized based on the data associated with and or gathered for each target recipient, wherein the mailform template 104 provides for various customizations based on the data.

The data associated with the target recipients, including the mailform template 104, may be stored in a data warehouse 108. The data warehouse 108 may include a memory, database, spreadsheet, or other storage configured or otherwise used to store information used by the document personalization system 102 in the generation of the personalized message 106. The information stored in the data warehouse 108 may include target recipient data 110 and one or more mailform templates 104A.

The target recipient data 110 may include any data associated with one or more target recipients. For example, the target recipient data 110 may include name, location, age, employment, hobbies, purchase and/or other information associated with one or more target recipients. Or for example, the target recipient data 110 may include statistics or statistical analysis, market data, industry data, or any other data. The target recipient data 110 may also include, for example, a language associated with the target recipient and which of a plurality of communication channels to use to contact the target recipient and/or deliver the personalized message 106 to the target recipient.

The data warehouse 108 may also store multiple mailform templates 104A. The mailform templates 104A may include the mailform template 104, discussed above, wherein the mailform template 104 may be an example of just one of the mailform templates 104A. Each of the mailform templates 104A may include, for example, a similar or standard format or variety of options that may be parsed by the document personalization system 102. Then for example, the document personalization system 102 may generate a plurality of personalized messages 106 based on any of the mailform templates 104A.

A variable parser 112 may determine variables 114 associated with the mailform template 104. The mailform template 104 may include the one or more variables 114. The variables 114 may include variables or other placeholders that are associated with at least a portion of the target recipient data 110. Then for example, the variables 114 from the mailform template 104 may be replaced with actual values from the target recipient data 110 in the personalized message 106. For example, a variable <name> (e.g., variables 114) may be replaced in the personalized message 106 by the name of the target recipient to whom the personalized message 106 is intended to be delivered. Thus, as just referenced, the variable parser 112 may parse the mailform template 104 to determine each of the variables 114. It should be understood that the variables 114 may be denoted in any format, and the <variable> notation is merely an example notation.

A data parser 116 may parse the target recipient data 110 to determine the values or data to be used to replace the variables 114. For example, the variable parser 112 may determine that the mailform template 104 includes the variables 114 <name>, <address>, <salary>, <past purchases> and <hobbies>. Then for example, the data parser 116 may parse the target recipient data 110 to determine those values corresponding to each of the variables 114 for each of the target recipients. This may prevent for example, the document personalization system 102 from wasting resources retrieving data from the target recipient data 110 not used by the mailform template 104. According to an example embodiment, the data parser 116 may retrieve all the variable information for each of the target recipients from the target recipient data 110 on one execution and store the retrieved data in a buffer 118. A single access of the target recipient data 110 by the data parser 116 may provide more rapid processing or generation of the personalized messages 106 based on the mailform template 104 as the data warehouse 108 may not need to be accessed again by the data parser 116.

The buffer 118 may include a memory or storage location used by the document personalization system 102 to temporarily store data retrieved or otherwise received from the data warehouse 108. The buffer 118 may improve the performance of the document personalization system 102 by allowing large quantities of data to be retrieved from the data warehouse 110 and stored locally in the buffer 118, thus reducing the need for multiple accesses of the data warehouse 108 by the document personalization system 102, including any portions thereof.

A condition evaluator 120 may evaluate one or more conditions 122 associated with the mailform template 104. According to an example embodiment, the mailform template 104 may include the one or more conditions 122. The conditions 122 may include conditions, procedures or other formulas used to determine which content 124 is to be included in the personalized message 104. The conditions 122 may, for example, be evaluated or be contingent upon data associated with one or more of the target recipients as determined from the target recipient data 110. For example, a condition 122 of the mailform template 104 may include determining which of a plurality of country flag images to include in the personalized message 106 based on the nationality of each target recipient. Then for example, the data parser 116, when retrieving the values of the variables 114, may retrieve any values necessary to evaluate any of the conditions 122, such as the nationality (which may be stored in the buffer 118.

The content 124 may include content to be used for, included in or otherwise displayed with the personalized message 106. The content 124 may include any content that is or may be associated with the personalized message 106. For example, the content may include text 126, images 128, and/or attachments 130. In other example embodiments, the content 124 may include hyper-text mark-up language (HTML) or other code, background designs, animations, multimedia, links or pointers, or any other content.

The content 124 may include standard content, which may be included in each personalized message 106 independent of attributes or data associated with each target recipient, and/or conditional content that may be included in the personalized message 106 upon the satisfaction of one or more of the conditions 122. Example standard content (e.g., 124) may include the name or logo of the company or individual(s) sending the personalized message 106 to the target recipient(s) to be included in each personalized message 106. Example conditional content (e.g., 124) may include images of products, if any, purchased by the target recipient within the past 6 months that is to be included in each target recipient's personalized message 106. The standard and/or conditional content may include any content associated with the mailform template 104 and/or personalized message 106.

The text 126 may include alpha-numeric text in one or more languages. For example, the text 126 may include an introductory paragraph in English, the introductory paragraph in French, and the introductory paragraph in German. In other example embodiments, the text 126 may be associated with a language translator that may translate text from one language to another. In other example embodiments, the text 126 may include special character text similar to those found in word processing systems or programs. The text 126 may include text that has been highlighted, bolded, italicized, underlined or otherwise formatted for the personalized message 106.

The images 128 may include any image to appear in the personalized message 106. For example, the images 128 may include background images, logos or other insignia, borders, buttons, pictures, animations, videos or other images that may be included in the personalized message 106.

The attachments 130 may include any attachment, file, document, image, directory or folder that may be attached to or otherwise delivered with the personalized message 106. The attachments 130 may include for example an article to which at least a portion of the personalized message 106 made reference to. In other example embodiments, the attachments 130 may include an invoice of product(s) recently purchased by the target recipient to be included with the personalized message 106.

As referenced above, the data parser 116 may determine the data values to replace the variables 114 and the condition evaluator 120 may evaluate the conditions 122 to determine the content 124, including the text 126, images 128, attachments 130 and/or other content, to be included in or with the personalized message 106. Then for example, replacement logic 132 may replace the variables 114 with the data values determined by the data parser 116 and replace the conditions 122 with the content 124 (e.g., the text 126A, images 128A and attachments 130A) determined by the condition evaluator 120. The text 126A, images 128A and attachments 130A may be one or instances of the content 124, including at least a portion of the target recipient data 110. The replacement logic 132 may perform the replacement in the personalized message 106 for each target recipient.

A layout engine 134 may determine a layout design 136 associated with the personalized message 106. The layout design 136 may include the layout of the content 124 in the personalized message 106. For example, the layout design 136 may include the placement of the text 126A, images 128A and attachments 130A in the personalized message 106. Similar to the content 124, the layout design 136 may be contingent, in part, on the data associated with each target recipient.

The layout engine 134 may layout or place the content 124 in the personalized message 106 based on the layout design 136. For example, the layout engine 134 may receive the content 124 from the replacement logic 132 and place it within the personalized message 106 based on the layout design 136.

A format engine 138 may format the personalized message 106, or a portion thereof, based on a content format 140. The content format 140 may include a data format of the personalized message 106. For example, the content format 140 may include multipurpose internet mail extensions (MIME), HTML, plain text, SMS, mobile internet, binary, ASCII or other data formats. In example embodiments, the content format 140 may be based on the target recipient and/or a communication channel via which the personalized message 106 is to be transmitted.

The format engine 138 may then format the personalized message 106 based on the content format 140. For example, the personalized message 106 may be stored in a binary format and may be converted or otherwise format into an HTML (e.g., content format 140) by the format engine 138. In example embodiments, a personalized message 106 may include or otherwise be associated with multiple content formats 140.

According to an example embodiment, the replacement logic 132 may replace the content 124, in the personalized message 106, based on a language 142. The language 142 may include one or more languages associated with the mailform template 104. For example, the mailform template 104 may be associated with the language 142. Then for example, the content 124 may be translated in or otherwise associated with the language 142. In other example embodiments, the mailform template 104 may be associated with a plurality of languages 142, wherein each target recipient may be associated with one or more of the languages 142. Then for example, the condition evaluator 120 may determine which of the languages 142 is associated with each target recipient and determine the content 124 associated with the determined language(s) 142, wherein the replacement logic 132 may place the content 124 with the associated personalized message 106 for each target recipient.

According to an example embodiment, the condition evaluator 120 may determine a subject line 144 for the personalized message 106. The subject line 144 may include the subject or summary of the contents of the personalized message 106. For example, the subject line 144 may include the subject line of an e-mail message specifying a topic associated with the e-mail. The subject line 144, may include text, images or other content that may be provided in or with the personalized message 106 on one or more lines.

A delivery engine 146 may deliver the personalized message 106 to one or more of the target recipients via one or more channels 148. The channels 148 may include any communication channels that may be used to deliver the personalized message 106. The channels 148 may include, for example, postal mail, wireless communication, SMS communication, the internet, e-mail, one or more connected networks, telephone, fax or any other channel.

The delivery engine 146 may transmit or otherwise provide the personalized message 106 to the channels 148 for transmission to the target recipient(s). For example the delivery engine 146 may provide the destination address, source address and/or other information for the transmission of the personalized message 106 via the channels 148. According to an example embodiment, the delivery engine 146 may include an e-mail or internet server connected to one or more networks.

According to an example embodiment, an execution service 150 may be associated with the document personalization system 102. The execution service 150 may include the variable parser 112, data parser 116, buffer 118, condition evaluator 120, replacement logic 132, format engine 138 and delivery engine 146. The execution service 150 may generate the personalized message(s) 106 for one or more target recipients based on a first mailform template 104. The document personalization system 102 may be associated with multiple execution services 146, wherein each execution service 146 may be associated with a mailform template 104 and/or language 142. According to an example embodiment, the execution service 146 may include a public class with public and/or private methods that may be called or otherwise referenced by an application 152.

According to another example embodiment, the execution service 150 may be configured to perform a test send. During a test send, for example, a test personalized message (e.g., test message) may be generated wherein the condition evaluator 120 does not evaluate the conditions 122 and/or the replacement logic 132 does not replace the variables 114. Then for example, the test message may be delivered to a test address or target recipient. The test send may be used for example to verify that the personalized message displays properly, including the proper variables 114 and/or conditions 122.

The application 152 may include an application, program, firmware, software or other code that calls or otherwise uses the document personalization system 102. For example, the application 152 may include a Customer Relationship Management (CRM) system, wherein the data warehouse 108 may include data associated with target recipients (e.g., customers, target recipients, potential customers, or other individuals or organizations) associated with the CRM system. Then for example, the application 152 may use the document personalization system 102 to execute a marketing campaign, to send personalized messages 106 to one or more of the target recipients.

According to an example embodiment, the application 152 may use or otherwise call the execution service 146 to generate and/or deliver the personalized messages 106. For example, the application 152 may send an initialization request 154 to the document personalization system 102, which may be handled by a request handler 156. The initialization request 154 may include a request to initialize one or more instances of the execution service 146. The initialization request 154 may include for example an identification of which mailform template 104 of the mailform templates 104A on which to base the personalized message 106. The initialization request 154 may also include a specification of one or more languages 142 associated with the mailform template 104 to use with regards to one or more of the targeted recipients. For example, a first initialization request 154 may identify a first mailform template 104A and a first language 142, wherein a second initialization request 154 may identify a second mailform template 104A and a second language 142. Then for example, the request handler 156 may handle the initialization request(s) 152.

The request handler 156 may receive and handle the initialization request(s) 152 received from the application 152. The request handler 156, as referenced above, may initialize one or more instances of the execution service 146 based on the initialization request 154. For example, the request handler 156 may initialize a first instance of the execution service 146 to handle a first initialization request 154 associated with a first mailform template 104 and a first language 142, and the request handler 156 may initialize a second instance of the execution service 146 to handle a second initialization request 154 associated with a second mailform template 104 and a second language 142. Then for example, the request handler 156 may provide the instances to the application 152.

The document personalization system 102 may generate personalized documents 106 for multiple target recipients, each personalized document 106 including content 124 personalized to the target recipients based on the target recipient data 110. The document personalization system 102 may then deliver the personalized messages 106 to the target recipients in any one of a plurality of content formats 140 via one of a plurality of channels 148.

Figure 2:
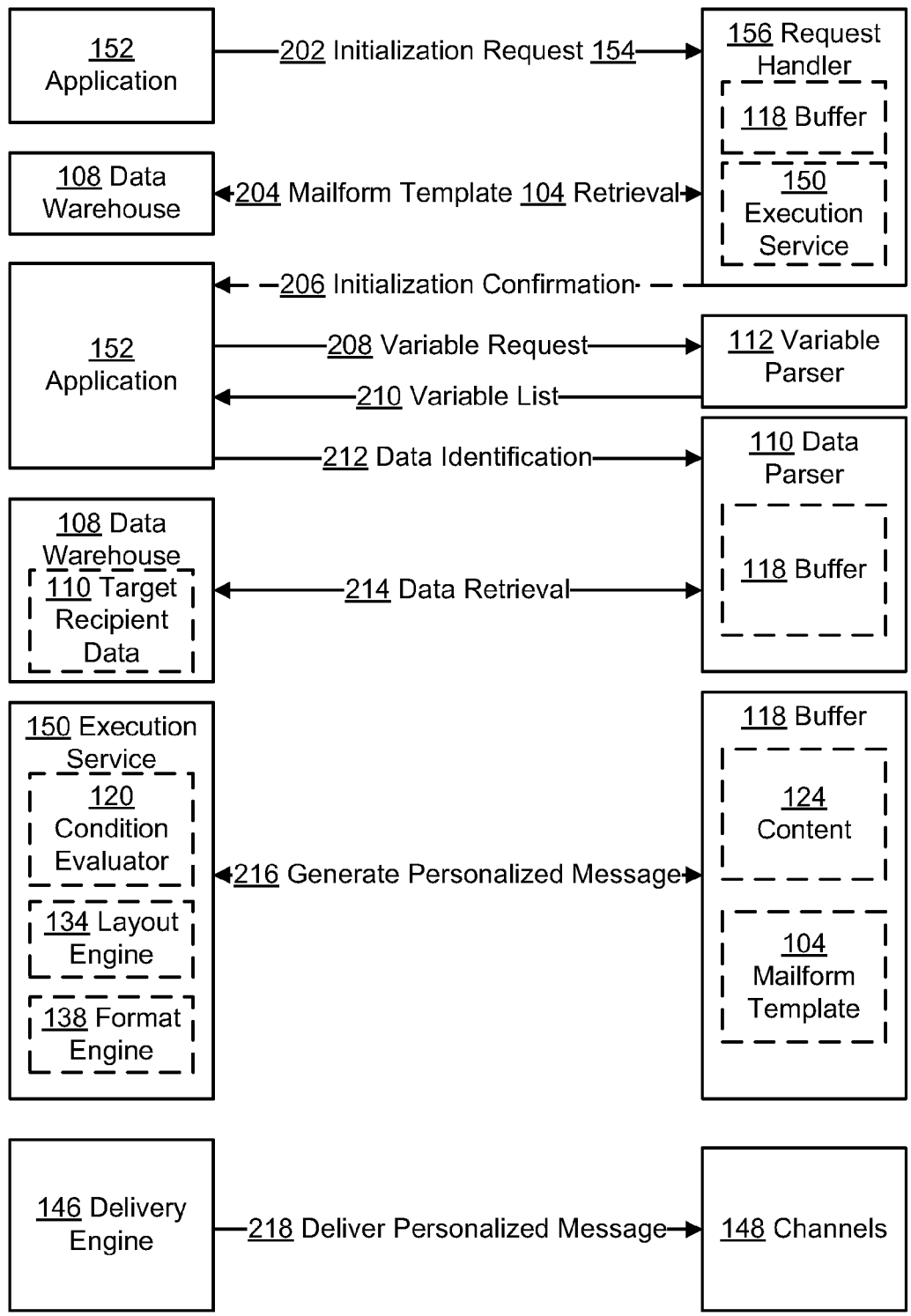
FIG. 2 is a communication diagram of example communications among elements associated with the system of FIG. 1, according to an example embodiment.

FIG. 2 is a communication diagram of example communications among elements associated with the system of FIG. 1, according to an example embodiment. In the example of FIG. 2, the objects may be similar or substantially similar to the like numbered elements of FIG. 1.

In communication 202 the application 152 may transmit or otherwise provide the request handler 156 with the initialization request 154. The initialization request 154 may include an identification of a mailform template 104, from one or more of the mailform templates 104A, with regards to which to initialize the execution service 150. The initialization request 154 may also include, for example, an identification of one or more languages (e.g., language 142) associated with the identified mailform template 104, with regards to which to initialize the execution service 150.

In communication 204, the request handler 156 may retrieve the mailform template 104 (or mailform templates) identified by the initialization request 154 from the data warehouse 108. For example, the request handler 156 may access the data warehouse 108 and retrieve the mailform template 104, which may be associated with an identified language 142, and store the mailform template 104, or a portion thereof, in the buffer 118. As referenced above, the buffer 118 may include a local memory or storage that may be associated with quicker access by one or more components of the document personalization system (e.g., 102). Then for example, processing time associated with generating the personalized messages 106 may be improved by storing information retrieved from the data warehouse 108 in the buffer 118; thus preventing for example, multiple accesses of the data warehouse 108, which may require greater processing (time) than accessing the buffer 118 for the same or similar information.

The request handler 156 may then initialize an instance of the execution service 150 based on the initialization request 154. For example, as referenced above, the execution service 150 may be a class (that may be called or otherwise used by the application 152), wherein an instance of the execution service 150 (class) may be initialized based on an initialization request 154. Then for example, initializing several instances of the execution service 150 based on multiple initialization requests 150, or otherwise multiple identifications of mailform templates 104, wherein each instance is associated with only a single mailform template 104, may allow for concurrent processing by the instances of the execution service 150, wherein the personalized messages 106 may be generated and/or delivered in less time.

In communication 206, the request handler 156 may confirm that the instance(s) of the execution service 150 has been initialized. In some example embodiments, the request handler 156 may pass the initialized instance of the execution service 150 to the application 152. Then for example, this may allow the application 152 to access one or more public methods and/or variables associated with the instance.

In communication 208, the application 152 may request the variables (e.g., variables 114) associated with the mailform template 104. For example, the application 152 may call a get_variables public method associated with the instance of the execution service 150. Then for example, the variable parser 112 may parse the mailform template 104 (from the buffer 118) for the variables. In communication 210, the variable parser may return to the application 152 a list of the variables.

In communication 212, the application 152 may provide to the data parser 110 an identification of which target recipients personalized messages 104 are to be generated for. For example, the application 152 may provide to the data parser 110 an identification of the data that corresponds to the variables. In other example embodiments, the application 152 may provide the target recipient identification prior to receiving the variable list.

In communication 214, the data parser 110 may retrieve the data associated with the target recipients. For example, the data retrieved from the target recipient data 110 for each target recipient may correspond to the variables of the variable list, and may be stored in the buffer 118. As referenced above, retrieving all of the corresponding data for each target recipient during one access of the data warehouse 108 by the data parser 110 and storing the data in the buffer 118 may decrease processing time by reducing the number of times the data warehouse 108 has to be accessed.

In communication 216, the execution service 150 may generate the personalized messages 104 based on the information stored in the buffer 118. For example, the condition evaluator 120 may evaluate the conditions (e.g., conditions 122) of the mailform template 104 to determine the content 124. Then for example, the layout engine 134 may lay out the content 124 in each personalized message 104 based on a layout design (e.g., layout design 136), and the format engine 138 may format the personalized messages 104 based on a content format (e.g., content format 140).

In communication 218, the delivery engine 146 may deliver the personalized messages 104 to each target recipient via one or more of the channels 148. For example, different target recipients may receive their associated personalized messages via different channels 148.

Figure 3:
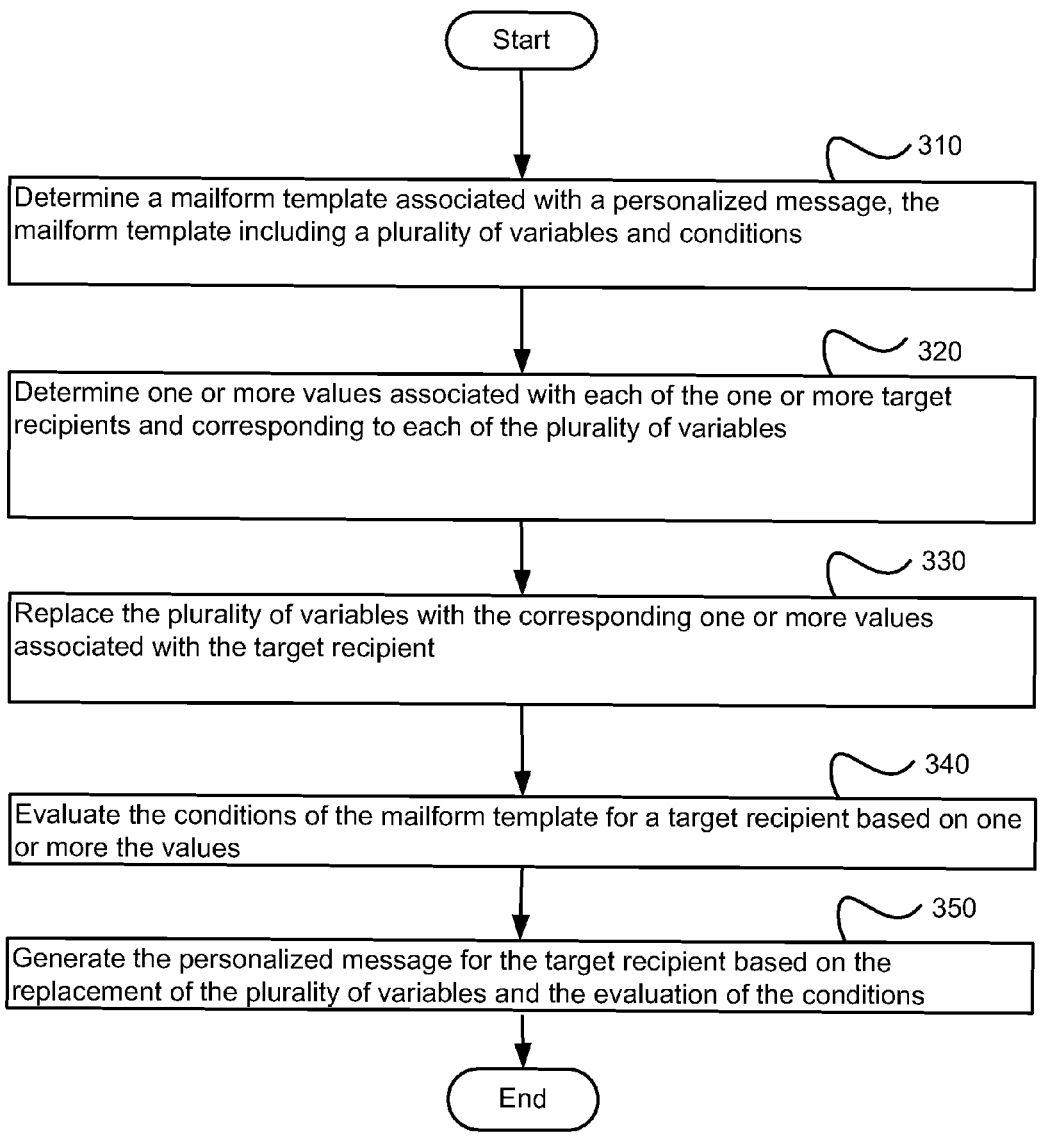
FIG. 3 is a flowchart illustrating example operations of the system of FIG. 1, according to an example embodiment.

FIG. 3 is a flowchart 300 illustrating example operations of the system of FIG. 1, according to an example embodiment. More specifically, FIG. 3 illustrates an operational flow 300 representing example operations related to the document personalization system 102.

After a start operation, a mailform template associated with a personalized message may be determined, the mailform template including a plurality of variables and conditions (310). For example, as shown in FIG. 1, the request handler 156 may determine the mailform template 104, the mailform template 104 including the variables 114 and the conditions 122.

One or more values associated with each of one or more target recipients may be determined, the values corresponding to each of the plurality of variables (320). For example, the data parser 116 may parse the target recipient data 110 for the values corresponding to the variables 114.

For each of the target recipients, the plurality of variables may be replaced with the corresponding one or more values associated with a target recipient (330). For example, the replacement logic 132 may replace the variables 114 with the values determined by the data parser 116.

For each of the target recipients, the conditions of the mailform template may be evaluated for the target recipient based on one or more of the values (330). For example, the condition evaluator 120 may evaluate the conditions 122 based on the values determined by the data parser 116.

For each of the target recipients, a personalized message may be generated based on the replacement of the plurality of variables and the evaluation of the conditions (340). For example, the replacement logic 132 may replace the variables 114 with the values determined by the data parser 116 and the content 124 determined by the condition evaluator 120.

Figure 4:
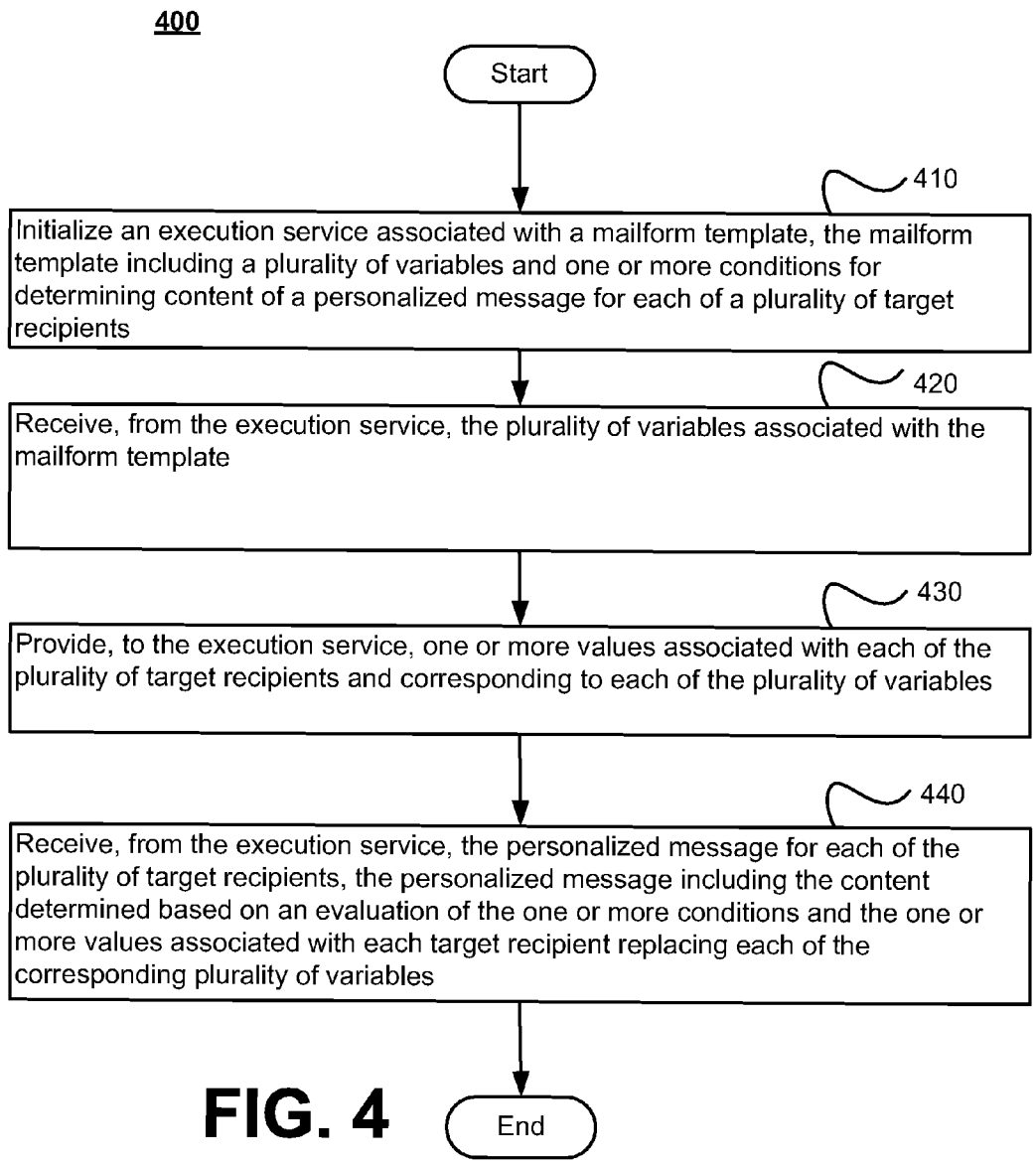
FIG. 4 is a flowchart illustrating example operations of the system of FIG. 1, according to an example embodiment.

FIG. 4 is a flowchart 400 illustrating example operations of the system of FIG. 1, according to an example embodiment. More specifically, FIG. 4 illustrates an operational flow 400 representing example operations related to the document personalization system 102.

After a start operation, an execution service associated with a mailform template may be initialized, the mailform template including a plurality of variables and one or more conditions for determining content of a personalized message for each of a plurality of target recipients (410). For example, as shown in FIG. 1, the request handler 156 may initialize the execution service 150 associated with the mailform template 104, the mailform template 104 including the variables 114 and the conditions 122 for determining the content 124 for the personalized message 106 for each of a plurality of target recipients.

The plurality of variables associated with the mailform template may be received from the execution service (420). For example, the application 152 may receive the variables 114 from the variable parser 112 of the execution service 320.

One or more values associated with each of the plurality of target recipients may be provided to the execution service, the values corresponding to each of the plurality of variables (430). For example, the data parser 116 may determine the values corresponding to the variables 114 associated with each of the target recipients from the target recipient data 110.

The personalized message for each of the plurality of target recipients may be received from the execution service, the personalized message including the content determined based on an evaluation of the one or more conditions and the one or more values associated with each target recipient replacing each of the corresponding plurality of variables (440). For example, the delivery engine 146 of the execution service 150 may provide the personalized message 106 for each of the target recipients to the application 152 and/or the target recipients via one or more of the channels 148. The personalized message 106 may include the content 124 that may be determined by the condition evaluator 120 based on an evaluation of the conditions 122 and the values replacing the variables 114.

Although the above description is provided in terms of specific examples, it will be appreciated that many other examples and settings are contemplated. For example, the term business document should be interpreted broadly as including any document that is used in profit generation of some sort, although the business document 104 also may refer to documents for non-profit endeavors as well, including, for example, schools, churches, charities, hospitals, or virtually any other organization. Further, the business document 104 is merely an example, and other applications, such as applications for personal use, also may be used.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the embodiments.

What is claimed is:

1. A system for providing a personalized message via one or more channels comprising:
    at least one processor and at least one memory device configured to implement, within the system:
    a template retriever configured to retrieve a mailform template from multiple mailform templates, the retrieved mailform template including at least a background based on data associated with a target recipient and an introductory paragraph based on data associated with the target recipient;
    a variable parser configured to determine a plurality of variables associated with the mailform template including a language associated with the mailform template, the mailform template including one or more conditions;
    a data parser configured to determine one or more values associated with the target recipient and corresponding to each of the plurality of variables;
    a condition evaluator configured to evaluate the one or more conditions based on one or more of the values associated with the target recipient to determine conditional content for placement in the retrieved mailform template, wherein the conditional content is associated with a sender of the personalized message and is less than all of the personalized message;
    replacement logic configured to replace, in the mailform template, each of the plurality of variables with the corresponding one or more values including replacing content with the language associated with the mailform template; and
    a delivery engine configured to provide the personalized message including the retrieved mailform template with the one or more values and the determined conditional content to the target recipient via one or more of the channels.

2. The system of claim 1 further comprising a buffer configured to store the mailform template, one or more values associated with the target recipient and the personalized message.

3. The system of claim 1 wherein the data parser is configured to receive the one or more values, or an identification thereof, from a calling application.

4. The system of claim 1 wherein the condition evaluator is configured to determine the conditional content including one or more attachments to the personalized message, one or more images associated with the personalized message, a subject line associated with the personalized message, Uniform Resource Locators (URLs), or text of the personalized message.

5. The system of claim 4 wherein the at least one processor and the at least one memory device are further configured to implement a layout engine configured to layout the content in the personalized message based on a layout design associated with the mailform template.

6. The system of claim 1 wherein the condition evaluator is configured to determine the conditional content based on the language associated with the mailform template.

7. The system of claim 1 wherein the delivery engine is configured to provide the personalized message to the target recipient via one or more of a plurality of channels, including an e-mail, fax, web, wireless, telephonic or SMS channel.

8. The system of claim 1 wherein the at least one processor and the at least one memory device are further configured to implement a format engine configured to format at least a portion of the content based on a content type associated with the mailform template.

9. A non-transitory computer readable medium comprising a computer program tangibly embodied thereon, the computer program being configured to cause a data processing apparatus to:
- determine a mailform template associated with a personalized message from multiple mailform templates based on data associated with each of one or more target recipients including a language associated with each of the one or more target recipients, the mailform template including a background based on data associated with each target recipient, an introductory paragraph based on data associated with each target recipient, a plurality of variables, and conditions;
- determine one or more values associated with each of the one or more target recipients and corresponding to each of the plurality of variables; and
- for each of the one or more target recipients:
  - replace the plurality of variables in the determined mailform template with the corresponding one or more values associated with the target recipient including the language associated with the target recipient;
  - evaluate the conditions of the mailform template for the target recipient based on one or more of the values associated with the target recipient to determine conditional content for placement in the mailform template, the conditional content being associated with a sender of the personalized message and being less than all of the personalized message; and
  - generate the personalized message for the target recipient based on the replacement of the plurality of variables in the determined mailform template and the conditional content determined based on the evaluation of the conditions.

10. The non-transitory computer readable medium of claim 9 wherein the computer program is further configured to cause the data processing apparatus to determine the mailform template based on receiving a selection of the mailform template from a calling application.

11. The non-transitory computer readable medium of claim 9 wherein the computer program is further configured to cause the data processing apparatus to evaluate based on determining conditional content of the personalized message based on the conditions.

12. The non-transitory computer readable medium of claim 9 wherein the computer program is further configured to cause the data processing apparatus to generate the personalized message based on formatting at least a portion of the personalized message based on a content type associated with the mailform template.

13. The non-transitory computer readable medium of claim 9 wherein the computer program is further configured to cause the data processing apparatus to generate the personalized message based on:
- determining the conditional content of the personalized message based on the evaluating and including the one or more values associated with the target recipient; and
- laying out the conditional content in the personalized message based on a layout design associated with the mailform template.

14. The non-transitory computer readable medium of claim 9 wherein the computer program is further configured to cause the data processing apparatus to provide the personalized message for each target recipient to each target recipient via one or more channels.

15. A method comprising:
- initializing an execution service which retrieves a mailform template from multiple mailform templates, the retrieved mailform template including a background based on data associated with a target recipient, an introductory paragraph based on data associated with the target recipient, a plurality of variables, and one or more conditions for determining conditional content of a personalized message for each of a plurality of target recipients, the conditional content being associated with a sender of the personalized message and being less than all of the personalized message;
- receiving, from the execution service, the plurality of variables associated with the mailform template including a language associated with the mailform template;
- providing, to the execution service, one or more values associated with each of the plurality of target recipients and corresponding to each of the plurality of variables, the values including content in the associated language; and
- receiving, from the execution service, the personalized message for each of the plurality of target recipients, the personalized message including the background, the introductory paragraph, the conditional content determined based on an evaluation of the one or more conditions, and the one or more values associated with each target recipient including the content in the associated language replacing each of the corresponding plurality of variables.

16. The method of claim 15 wherein the initializing comprises initializing the execution service associated with the mailform template and a language.

17. The method of claim 15 further comprising:
- requesting the plurality of variables associated with the mailform template.

18. The method of claim 15 wherein the receiving the personalized message comprises receiving, from the execution service, a notification that the personalized message has been provided to each of the plurality of target recipients.

* * * * *